Inventor,
Richard H. Arndt,
by Gilbert P. Tarleton
His Attorney.

May 6, 1969   R. H. ARNDT   3,443,158
FAULT CURRENT RECORDER AND INDICATOR FOR ELECTRICAL CIRCUITS
Filed Sept. 8, 1966   Sheet 3 of 4

Inventor,
Richard H. Arndt,
by Gilbert P. Tarleton
His Attorney.

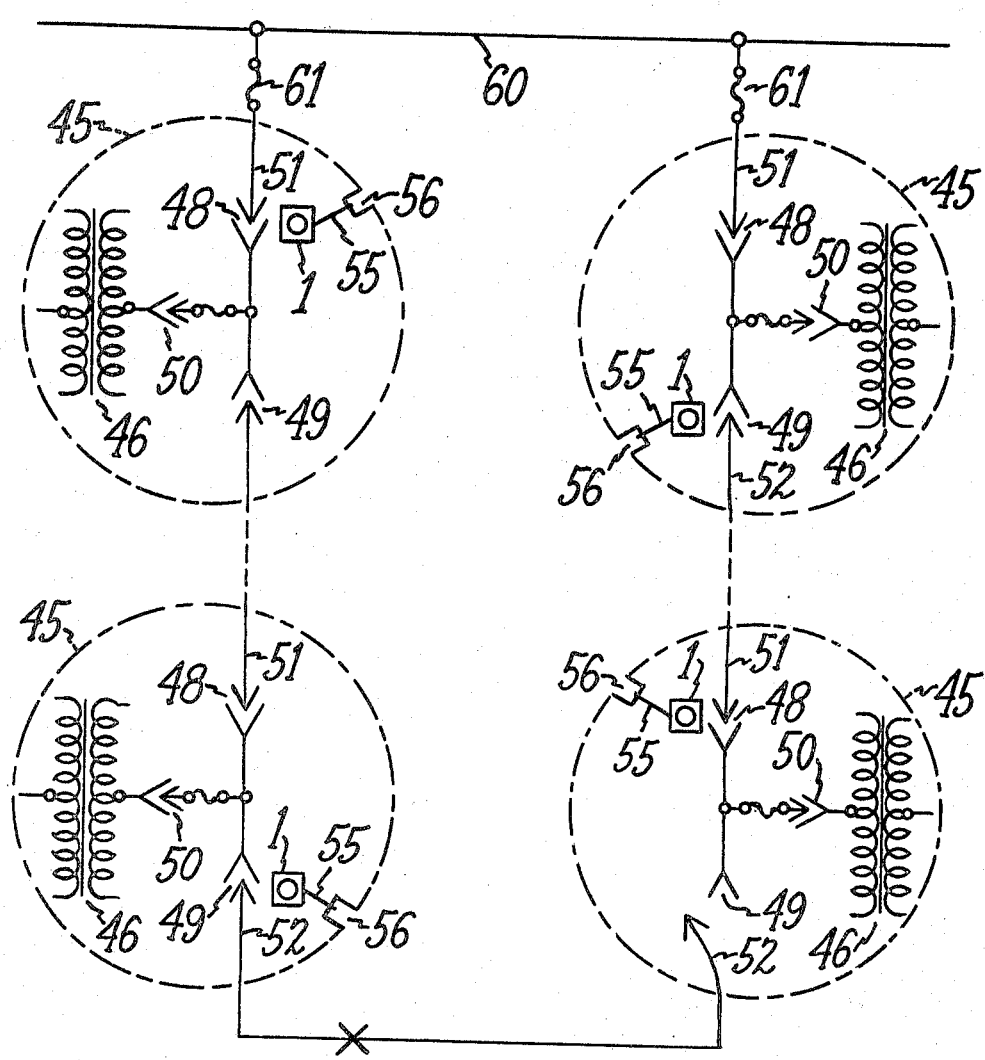

United States Patent Office 3,443,158
Patented May 6, 1969

3,443,158
FAULT CURRENT RECORDER AND INDICATOR FOR ELECTRICAL CIRCUITS
Richard H. Arndt, Lenox, Mass., assignor to General Electric Company, a corporation of New York
Filed Sept. 8, 1966, Ser. No. 577,971
Int. Cl. H02h 1/02, 3/28; G01r 31/08
U.S. Cl. 317—18                              25 Claims

ABSTRACT OF THE DISCLOSURE

A fault current recorder and indicator for an electric power cable termination that is characterized by utilizing a magnetically actuated switch means to sense a fault current condition and store information regarding the occurrence of such a condition, in combination with readout means for ascertaining the nature of the information stored by the switch means.

---

Figure 1:
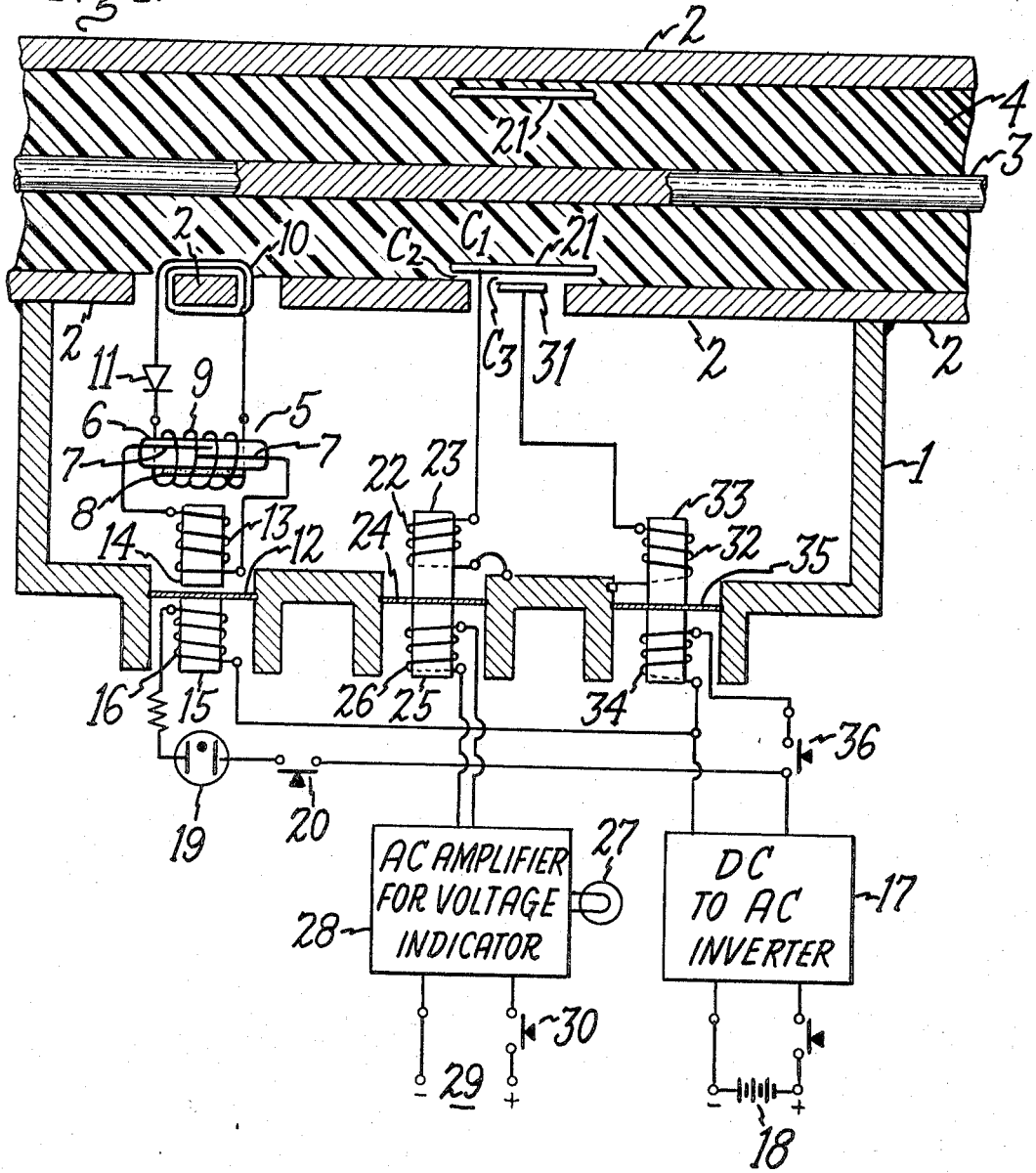

This invention relates to monitoring devices for electric circuits and more particularly to a fault current detector, storage and readout device for electric power distribution circuits.

In underground electric power distribution systems there is a problem in locating a fault in the buried cable conductor. Usually the cable is in sections which interconnect apparatus such as distribution transformers which are usually installed in vaults with removable covers or grills so that the ends of the cable sections are relatively accessible. Usually the connections are made by so-called terminations which not only serve as detachable plug and socket connectors but also grade the stress in the insulation for the central high voltage cable conductor in the region where the surrounding concentric conducting ground potential sheath of the cable has been stripped back. A termination may therefore be described as a stress-controlling coaxial power connector.

In accordance with this invention, there is provided a novel, simple and low cost fault monitoring device which lends itself to mounting on a termination or the like but need not be so mounted. It responds to passage of a fault current sufficiently high to operate the usual overcurrent distribution protective equipment, such as a fuse, and stores that information. By having at least one device in each vault and interrogating them after an outage the faulted section can quickly be located between the one electrically farthest from the fuse or the like, which indicates that a fault current has passed through and the next electrically adjacent one which does not have such indication. Once the faulted cable section is located it can be isolated by opening the usual switches or disconnecting its terminations, and usually power can be restored to all the transformers by replacing the fuse and feeding the sections beyond the isolated section from the other end through a loop closing termination or switch.

The interrogation can either be done sequentially and locally by a portable readout device or centrally and simultaneously by means of telemetering circuits or links from all of the devices to a central point. The latter has the advantage that a service crew can be dispatched directly to the locations or vaults between which a faulted cable section extends.

An object of the invention is to provide a new and useful monitoring device for electric circuits.

Another object of the invention is to provide a simple, low cost fault current detecting storage and readout device for electric circuits.

A further object of the invention is to provide an improved cable termination containing a monitoring device.

The invention will be better understood from the following description taken in connection with the accompanying drawings and its scope will be pointed out in the appended claims.

Figure 2:
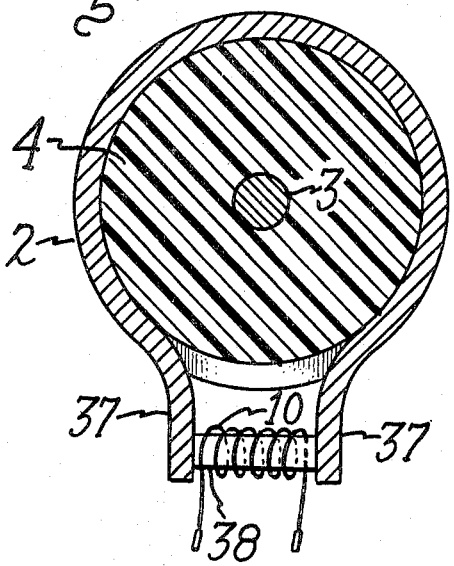
Figure 3:
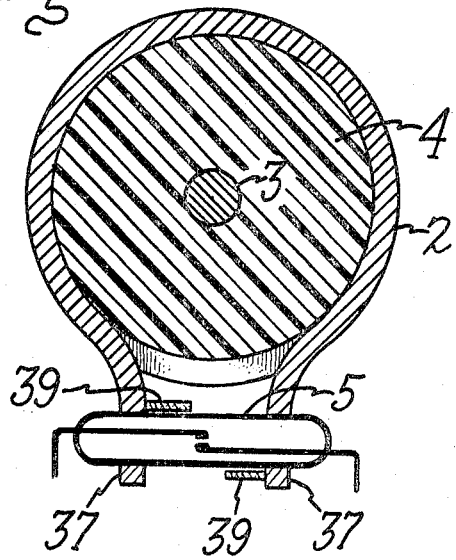
Figure 4:
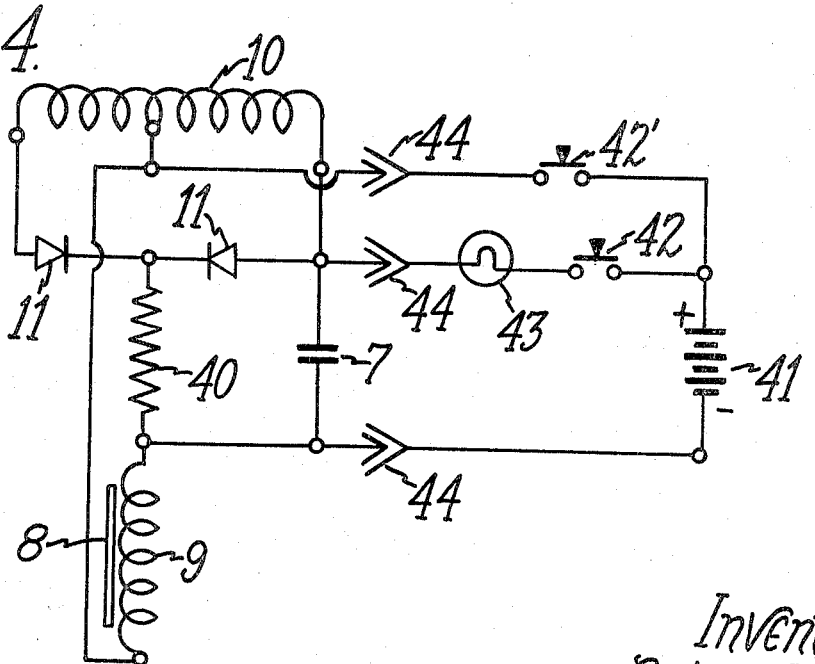
Figure 5:
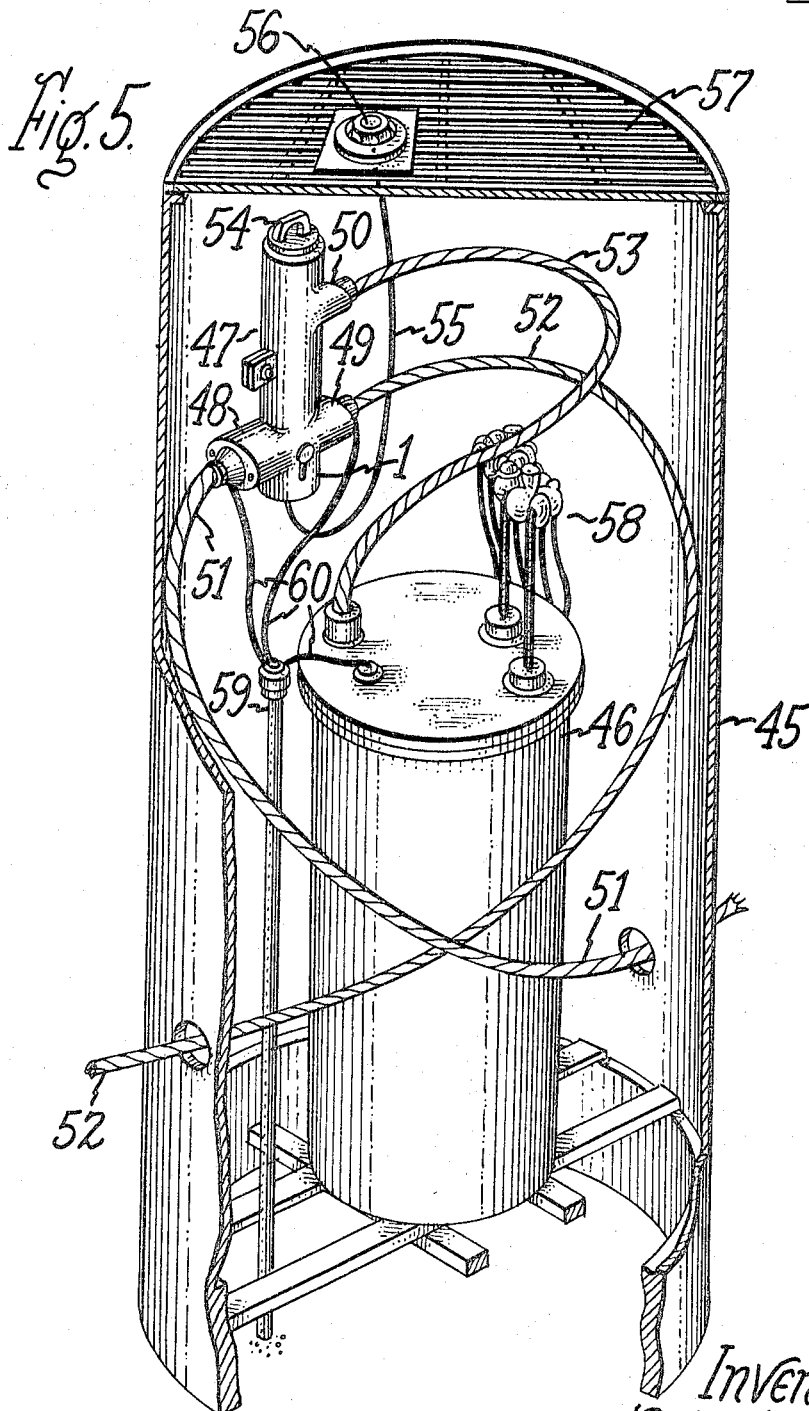

In the drawings,

FIGURE 1 is a diagrammatic illustration of an embodiment of the invention,

FIGURE 2 is a modification using the shell of a termination as part of the housing for the fault detector and as a flux concentrator for its pick-up coil, FIGURE 3 is a view similar to FIG. 2 in which a reed switch is actuated directly by the concentrated flux in the modified shell of a termination, FIGURE 4 is a modified circuit with better pull-in to reset ratio and with automatic reset, FIGURE 5 is a cutaway view of a transformer vault equipped with an example of the invention, and FIGURE 6 is a one line circuit diagram of a number of vaults similar to the one in FIGURE 5 connected to constitute a loop of an underground electric power distribution system.

Referring now to the drawings and more particularly to FIGURE 1, the device is shown enclosed in a housing 1 of any suitable material such as sheet metal and the housing is attached to and closed by a metallic wall 2 which is at ground potential and which concentrically surrounds a coaxial current carrying conductor 3, typically the central insulated primary distribution voltage conductor of an underground cable. Insulation 4 occupies the space between the conductor 3 and the grounded metallic sheath 2. The latter is preferably the outer shell of a cable termination, but this is not necessary. In the preferred embodiment of the invention the insulation 4 is a solid material, such as a suitable epoxy or a resilient insulating rubber, but it will be understood that other suitable insulating means may be used to electrically insulate the conductor 3 from the sheath 2.

The principal element of the device is a current or magnetic flux responsive recorder device having a normal unactuated condition or position and an abnormal actuated position or condition, which once attained is retained by latching means. A simple, inexpensive and highly satisfactory form of such device is an ordinary magnetic reed switch, indicated at 5. It comprises a sealed envelope 6 through which in opposite directions extend flexible resilient magnetic reeds 7 terminating inwardly in electrical contacts, in combination with a permanent magnet 8 for providing the latching flux. The envelope 6 is preferably filled with an inert gas at approximately atmospheric pressure. The contacts are shown normally open, but they may of course also be normally closed.

The device 5 may be made responsive to the magnitude of the current flow in conductor 3 in any suitable manner. As illustrated it is provided with a surrounding actuating coil 9 connected to a flux pickup coil 10 in the magnetic field produced by the current flow in conductor 3, the connection being through a rectifier 11 which may either be a half-wave rectifier as shown or a full-wave rectifier. In order to strengthen the response of the pickup coil 10, slits have been cut in the sheath 2 and the coil 10 wound around the portion of the sheath 2 between the slits. By making the metallic ground sheath of magnetic material, it will concentrate the flux produced by current flow in the coil 3 so that a higher voltage will be induced in the pickup coil 10. By this construction the outer protective grounded sheath also serves the dual function of a magnetic core for the pickup coil 10.

The detecting and storage device 5 may be interrogated or read out by merely connecting a circuit to its terminals which will indicate which of its two states or positions it is in. However, in FIGURE 1 this is done by transformer action through a nonmagnetic diaphragm 12 in the cover of the housing 1 so that the device may be hermetically sealed in case the vault in which it is located becomes flooded with water. As shown, a coil 13 on a magnetic core 14 is connected across the contacts 7, a pole of the core being in close proximity to the diaphragm 12. Another core 15, carrying another coil 16 is placed in close proximity with the outer wall of the diaphragm 12. Coil 16 is connected in a circuit including a source of alternating current, such for example as a portable direct current to alternating current inverter 17, powered by a battery 18. The alternating current output circuit of the inverter includes an indicator such as a glow lamp 19 and a pushbutton switch 20 if desired. The voltage on the glow lamp 19 will be dependent on the reactance of the coil 16 which in turn, due to the transformer coupling, will be dependent on the impedance of the circuit of the coil 13 so that when the coil 13 is short circuited by closed contacts 7, the lamp 19 will light up whereas if the contacts 7 are open, the impedance of the coil 16 will be so high that the lamp 19 will not light up.

The elements 15 through 20 can be mounted on a portable probe or stick which can be inserted by a serviceman into the vault in order to press the core 15 against the diaphragm 12 so that readout of the device 5 can take place regardless of whether or not the vault containing the device 1 is flooded.

The device 5 is so calibrated that at any predetermined value of fault current in the conductor 1 the net flux through it will attain a value sufficient to move it from its deactuated to its actuated position, i.e., in the device shown to close the contacts 7. However, as soon as the contacts 7 close, the reluctance of the flux path for the latching permanent magnet 8 becomes so low that the contacts remain latched closed even though the current in the main conductor 1 is interrupted as by the operation of automatic overcurrent protective equipment such as a fuse or circuit breaker (not shown).

It is desirable that such a fault detecting and storage device automatically reset itself after conditions on the main circuit conductor 3 have returned to normal. One of the advantages of the device shown in FIGURE 1 is that the means for accomplishing this is already present. All that is necessary is that the permanent latching magnet 8 be oriented so that the polarity of its flux opposes the porality of the actuating flux of the operating coil 9. While this requires a somewhat higher current in the coil 9 to actuate the device 5 and close its contacts, this is no problem. It has been found that with such an arrangement, as soon as the main current is interrupted, the permanent magnet 8 will reverse the flux through the closed contacts before they can separate, so that the reed switch 5 will remain in its latched closed position. If now operating current is again reestablished in the main conductor 3, it will cause the resulting current in the operating coil 9 to neutralize the flux of the permanent magnet, so that when the net flux gets small enough the contacts 7 spring apart and the device is automatically reset.

Also mounted in the housing 1 are voltage indicating means and a test circuit therefor. While these broadly are not a part of this invention, their structural combination with the fault indicator and the transformer means for coupling them to external circuits are a part of the present invention.

The voltage indicator circuit includes a conductive surface 21 embedded in insulation 4, and it may be a cylinder mounted coaxially with the main current carrying conductor 3. This constitutes a capacitance potential divider comprising a capacitor C1 between the conductor 3 and the surface 21 and a capacitor C2 between the surface 21 and the metallic shell 2. Connected across C2 is a coil 22 on a core 23 one of whose poles is in proximity to a nonmagnetic diaphragm 24, similar to the diaphragm 12. On the other side of the diaphragm 24 may be placed a similar core 25 carrying a coil 26 which is connected to the input of an alternating current amplifier 28, whose output circuit is connected to any suitable indicator such as lamp 27. The amplifier is powered by any suitable source of current supply 29 through a pushbutton switch 30. The elements 25 through 30 may also be mounted on the same probe as that used for reading out the fault detector.

The operation of the voltage indicator is as follows:

With normal voltage on the circuit conductor 3, a fraction of that voltage will appear across C2 and the coil 22. This will induce a voltage in the coil 26 which is amplified by the amplifier 27 to cause the light 8 to light, assuming of course that power is supplied to the amplifier by closing the switch 30. In this manner, a serviceman can safely determine from outside the vault and without danger from shock whether or not the line conductor 3 is charged with a voltage difference to ground.

The test circuit for testing the integrity of the voltage indicator circuit comprises an auxiliary electrode 31 between which and the electrode 21 there is a capacitance C3. A coil 32 on a core 33 is connected between electrode 31 and the casing 1 i.e., the conducting shell 2 so that in effect it is connected across C2 and C3 in series making them a capacitance potential divider. Coil 32 is energized by transformer action from a coil 34 through a diaphragm 35 as previously described for the other circuits, and coil 34 is energized through a pushbutton switch 36 from across the A-C output to the inverter 17. In this manner when switches 36 and 30 are closed the voltage indicator lamp 28 will light if the voltage indicator circuit is intact. The parts 34 and 36 may of course also be mounted on the same test probe or stick as the other coils 16 and 26.

FIGURE 2 shows a modified way of exciting the pickup coil 10. This is essentially a sectional view taken perpendicular to the main conductor 3 in FIGURE 1. In this figure the magnetic shell 2 is slit both transversely and longitudinally and the resulting tabs or flaps 37 are folded outwardly so as to constitute two of the sides of the housing 1 in FIGURE 1. Extending between the bent out portions 37 is a magnetic core piece 38 on which the coil 10 is wound.

The use of a pickup coil 10 is not essential as FIGURE 3 shows an arrangement in which the fault detector device 5 is actuated directly by the magnetic flux produced by the current in the conductor 3. In this figure the device 5 extends between the bent out tabs 37 similar to those shown in FIGURE 2. Such direct response is particularly suitable for a system in which the conductor 3 carries direct current because then the reed switch will respond only to magnitude of flux which, of course, is directly proportional to the current producing the flux. Of course, care must be taken to prevent saturation of the magnetic material.

The reed switch 5 may also be actuated by alternating flux either directly as in FIGURE 3 or without a rectifier as in FIGURE 2 or by eliminating the rectifier in FIGURE 1. However, because of the unidirectional polarity of the latching permanent magnet the pull-in levels of the switch will be different for alternate half cycles. This differential pull-in effect can be eliminated by mounting the latching magnet 8 at right angles to the position shown in FIGURE 1 so that its field through the contacts is in quadrature with the main field for closing the contacts. Due to this quadrature relationship of the fluxes the reversal in direction of the main driving flux will neither add to or subtract from the holding flux of the magnet 8.

Another way of obtaining equal pull-in levels for the positive and negative half cycles of alternating operating flux for the reed switch is to use two reed switches physically and electrically in parallel with the polarities of the respective latching magnets in opposite directions so that one switch is more sensitive to positive half cycles and the other switch is more sensitive to negative half cycles.

The previously described automatic reset feature involving reversal of the polarity of the latching permanent magnet produces a rather low (for example 10 to 1) pull-in to reset ratio of main current. It is sometimes desirable to have a much higher ratio (such as 300 to 1). This can be accomplished by using in the primary magnetic field which actuates the reed switch special magnetic material (such as Mu Metal) which has a high permeability at low coercive force but which saturates at higher coercive forces so as to have relatively low permeability. Such material can either be used as the core 38 of the pick-up coil 10 in FIGURE 2 or as sort of a magnetic yoke 39 within which the reed switch 5 is placed when the reed switch is directly actuated by the magnetic field of the conductor 1 as in FIGURE 3. With either such arrangement, much smaller amounts of current in the conductor 3 will produce sufficient flux to cause reset or dropout of the reed switch than if the magnetic response were linear. At the same time, the pull-in characteristics are comparable to those having an air core or a linear magnetic response. Consequently, the pull-in to reset ratio is increased. By combining magnetic materials having different magnetic characteristics almost any desired pull-in to reset ratio can be obtained.

Another way of increasing the pull-in to reset ratio is shown in FIGURE 4 and comprises connecting the contacts 7 of the reed switch 5 across the rectifier 11 and providing an impedance 40 connected in series with the actuating coil 9 for the reed switch 5. Actually in FIGURE 4 the rectifier 11 instead of being a half-wave rectifier or a bridge connected full-wave rectifier is a so-called biphase rectifier utilizing a midtap on the pickup coil 10.

The operation of FIGURE 4 is such that as soon as the reed switch 5 pulls in and closes its contacts 7 the resistance 40 is effectively short circuited and it takes less voltage in the pickup coil 10 to provide the required resetting current in the actuating coil 9 for overcoming the bias of the holding magnet. In the circuit of FIGURE 4 automatic reset will occur at a low level of voltage in pickup coil 10. Actually as the rectifier is short-circuited by the reed switch contacts 7 there will be alternating current which will flow in the coil 9, one set of half-cycles being in the wrong direction to cause reset and the other half cycles being necessarily in the direction to cause reset.

In FIGURE 4 the portable interrogation and readout circuit comprises a battery 41, a pushbutton switch 42, and an indicator such as a filament type signal lamp 43 connectable in series across the contacts 7 of the reed switch through quick detachable connectors or simple jacks 44. In addition, the portable device may also include a manual reset pushbutton switch 42 whereby current from the battery 41 may be caused to flow through another connector 44 and through the operating coil 9 in the proper direction for resetting the switch 5.

It is to be noted that the automatic reset action of FIGURE 4 does not depend upon the direction or polarity of the magnetic bias of the reed switch 5 as in the case for FIGURE 1. This, of course, is because with the automatic reset action of FIGURE 4 the coil 9 is energized with alternating current so that regardless of the direction of the bias one set of half-waves of energization of the coil 9 will be always in opposition to the magnetic bias.

FIGURE 5 illustrates one way in which the monitoring device of the present invention may be mounted and connected in an underground transformer vault for an electric power distribution system. This is a cutaway view of a vault 45 within which is mounted a distribution transformer 46. The power connections may be made by a so-called loadbreak T-tap 47 attached to the inner wall of the vault 45. This comprises three cable terminations 48, 49 and 50. The termination 48 may be for an incoming cable 51, the termination 49 may be for an outgoing cable 52, and the termination 50 is for a cable 53 extending between the transformer 46 and the cables 51 and 52. A combination fuse and manual loadbreak is mounted in the device, the operating handle being at 54. The housing 1 for the monitoring device and circuit including the fault detector, voltage indicator, and test circuit is shown mounted at the bottom and is connected by a multiconductor lead 55 to a socket 56 in the cover or grille 57 for the vault. In this manner, a portable interrogation probe may be used to engage the terminals of the cable 55 in the socket 56 for determining whether or not a fault current has passed through the vault 45 in the cables 51 and 52, whether or not there is line voltage in the vault and whether or not the voltage indicator circuit is intact. In this embodiment the readouts are direct and not by transformer coupling as in FIGURE 1.

In FIGURE 5 the secondary low voltage terminals of the transformer 46 are indicated at 58 and all the exposed metallic parts are grounded by a rod 59 and connectors 60.

FIGURE 6 shows a plurality of the vaults 45 connected in a single phase loop circuit to one of the conductors 60 of a three-phase line such as an overhead line. The ends of the loop are connected to the circuit 60 by means of fuses or fuse cutouts 61. One of the terminations such as the outgoing terminations 49 of the lower right-hand vault 45 is left open so that the loop is normally unclosed. If now a fault such as a ground should occur at X the fault current will flow through the left-hand fuse 61 to the fault thus blowing that fuse. The other or right-hand fuse will remain intact because as the termination 49 does not close the loop, fault current cannot be fed to the fault X through the right-hand fuse 61.

If now the fault detectors contained in the housings 1 are interrogated through the sockets 56 of the vaults they will indicate that fault current has passed through the two left-hand vaults but not the right-hand vaults thus quickly locating fault between the two lowermost vaults as viewed in FIGURE 6. Therefore, the termination 49 in the lower left-hand vault 45 can be opened, the left-hand fuse 61 replaced and power quickly restored to all of the transformers 46. The faulted cable section between the two lowermost vaults 45 will then be isolated so that it can be replaced or repaired while service is maintained to all of the vaults of the system.

While there have been shown and described particular embodiments of the invention, it will be obvious to those skilled in the art that changes and modifications may be made without departing from the invention, and therefore it is intended by the appended claims to cover all such changes and modifications as fall within the true spirit and scope of the invention.

What I claim as new and desire to secure by Letters Patent of the United States is:

1. A device for detecting that a fault current sufficiently high to actuate automatic fault current interrupting means has passed a point on a single circuit conductor and for storing that information for subsequent interrogation and readout for the purpose of locating the fault comprising, in combination, a magnetic reed switch electromagnetically coupled only to said single conductor so that the magnetic field produced by such a fault current will actuate said switch, and a permanent magnet producing a magnetic field for latching said switch actuate, said permanent magnet being oriented so that the polarity of its flux opposes the polartiy of the actuating flux in the magnetic field produced by said fault current.

2. A device for detecting that a fault current sufficiently high to actuate automatic fault current interrupting means has passed a point on a circuit conductor and for storing that information for subsequent interrogation and readout for the purpose of locating the fault comprising, in combination, a magnetic reed switch electromagnetically coupled to said conductor so that the magnetic field produced by such a fault current will actuate said switch, a permanent magnet producing a magnetic field for latching said switch in its actuated position, and having a second magnetic reed switch connected electrically in parallel with the first reed switch, said second switch being similarly coupled to said conductor and similarly provided with a latching permanent magnet, the directions of the actuating and latching fields in the respective switches being cumulative and opposed for one direction of current in said conductor and being opposed and cumulative for the other direction of current in said conductor.

3. A device as in claim 1 in which said reed switch is directly and only actuated by the magnetic field of said single conductor.

4. A device for detecting that a fault current sufficiently high to actuate automatic fault current interruption means has passed a point on a circuit conductor and for the storing that information for subsequent interrogation and readout for the purpose of locating the fault comprising, in combination, a magnetic reed switch electromagnetically coupled to said conductor so that the magnetic field produced by such a fault current will actuate said switch, and a permanent magnet producing a magnetic field for latching said switch actuated, said reed switch being actuated indirectly by the magnetic field of said conductor through a pick-up coil in the field of said conductor connected to an actuating coil surrounding said switch, and a rectifier electrically connected between said pick up coil and actuating coil.

5. A device as in claim 4 in which said rectifier is a half-wave rectifier.

6. A device as in claim 4 in which said rectifier is a full-wave rectifier.

7. A device as in claim 1 in which the actuating and latching magnetic fields of said switch are in opposite directions.

8. A device as in claim 1 in which the actuating and latching magnetic fields of said switch are in quadrature so that the level of actuating flux to cause actuation of the reed switch will be independent of the direction of the actuating flux.

9. A device for detecting that a fault current sufficiently high to actuate automatic fault current interruption means has passed a point on a circuit conductor and for storing that information for subsequent interrogation and readout for the purpose of locating the fault comprising, in combination, a magnetic reed switch electromagnetically coupled to said conductor so that the magnetic field produced by such a fault current will actuate said switch, and a permanent magnet producing a magnetic field for latching said switch actuated, combined with a portable readout device manually connectable across said switch.

10. A device as in claim 1 having means responsive to current flow in said circuit conductor subsequent to fault current flow therein for automatically resetting said reed switch.

11. A device as in claim 10 in which said means is a reversed polarity latching permanent magnet for said reed switch.

12. A device as in claim 1 with saturable magnetic core means interposed between said reed switch and the field of said conductor for increasing the pull-in to drop-out ratio of said reed switch.

13. A device as defined in claim 9 wherein said portable readout device comprises a source of current and an electric indicator manually connectable serially across said switch.

14. A device as defined in claim 9 wherein said portable readout device comprises a circuit and a permanent magnet mounted on an end of a rod for respective selected connection across said switch and in juxtaposition to said switch, said circuit comprising a source of current and an electric indicator in series.

15. A device as defined in claim 9 wherein said portable readout device comprises an insulating rod, a pair of contacts and a magnet coil mounted on an end of said rod, an electric indicator on said rod, a source of current in said rod, and a switch for selectively connecting said source across said contacts in series with said indicator and across said magnet coil.

16. In a cable termination for underground residential electric power distribution systems, a fault current detecting storage and readout device comprising an electromagnetically actuated switch spring biased to a normal position and actuatable to an abnormal position in response to the magnetic field of an abnormal overcurrent through the cable termination, latching means for holding said switch in its abnormal position, and portable interrogation means manually couplable to said switch for indicating which of its positions it is in.

17. A termination as in claim 16 provided with unlatching means for resetting said switch from its abnormal to its normal position.

18. A termination as in claim 16 in which said switch is a magnetic reed switch and said latching means is a permanent magnetic.

19. In an underground residential electric power distribution system, a plurality of covered vaults each containing electrical apparatus having a primary distribution voltage terminal bushing, buried primary distribution voltage cables extending between said vaults and detachably connected to said bushings, by stress controlling cable terminations, an electromagnetically operated switch in each of at least selected ones of said terminations, said switch being spring biased to a normal position and actuatable to an abnormal position in response to the magnetic field of an abnormal overcurrent though its enclosing termination, means adjacent each switch for latching it in its abnormal position, portable interrogation means for selective manual coupling to each switch through its vault cover for indicating which position said switch is in.

20. A system as in claim 19 having means for resetting each switch from its abnormal position to its normal position.

21. A system as in claim 19 in which each switch is a magnetic reed switch and its latching means is a permanent magnet.

22. In a cable termination for underground residential distribution systems, a generally cylindrical shell of magnetic metal, a high voltage load current carrying conductor extending axially through said shell, solid insulation between said shell and conductor, an electromagnetically responsive recorder of passage of fault current in said conductor through said termination, and means including said shell for concentrating the magnetic flux associated with current flow in said conductor and applying it for actuating said recorder.

23. In a cable termination for underground residential distribution systems, a generally cylindrical shell of magnetic metal, a high voltage load current carrying conductor extending axially through said shell, solid insulation between said shell and conductor, an electromagnetically responsive recorder of passage of fault current in said conductor through said termination, and means including a winding linking magnetic flux in said shell produced by current flow in said conductor and concentrated by said shell for actuating said recorder.

24. In a cable termination for underground residential distribution systems, a generally cylindrical shell of magnetic metal, a high voltage load current carrying conductor extending axially through said shell, solid insulation between said shell and conductor, an electromagnetically responsive recorder of passage of fault current in said conductor through said termination, and a window in said shell, said window being bounded in the direction of magnetic flux in said shell by integral radially outwardly extending pole pieces on said shell for concentrating said flux for actuation of said recorder.

25. In a cable termination for underground residential distribution systems, a generally cylindrical shell of magnetic metal, a high voltage load current carrying conductor extending axially through said shell, solid insulation between said shell and conductor, an electromagnetically responsive recorder of passage of fault current in said conductor through said termination, a window in said shell, said window being bounded in the direction of magnetic flux in said shell by integral radially outwardly extending pole pieces on said shell for concentrating said flux, a coil for actuating said recorder, and a bar core for said coil bridging said pole pieces.

References Cited

UNITED STATES PATENTS 3,376,477    4/1968    Weinger _____ 317—18

JOHN F. COUCH, *Primary Examiner.*

R. V. LUPO, *Assistant Examiner.*

U.S. Cl. X.R.

317—27; 324—52; 340—255